United States Patent
Hall et al.

(10) Patent No.: US 7,985,059 B2
(45) Date of Patent: Jul. 26, 2011

(54) FORMABLE SEALANT BARRIER

(76) Inventors: David R. Hall, Provo, UT (US); Ronald B. Crockett, Payson, UT (US)

( * ) Notice: Subject to any disclaimer, the term of this patent is extended or adjusted under 35 U.S.C. 154(b) by 0 days.

(21) Appl. No.: 12/512,889

(22) Filed: Jul. 30, 2009

(65) Prior Publication Data

US 2009/0302501 A1    Dec. 10, 2009

Related U.S. Application Data

(63) Continuation of application No. 12/512,863, filed on Jul. 30, 2009, now Pat. No. 7,927,085, which is a continuation-in-part of application No. 11/469,229, filed on Aug. 31, 2006, now Pat. No. 7,575,425.

(60) Provisional application No. 61/164,956, filed on Mar. 31, 2009.

(51) Int. Cl.
    *B29C 43/02*    (2006.01)
    *B28B 3/00*    (2006.01)
(52) U.S. Cl. .................. 425/77; 425/405.2; 425/809
(58) Field of Classification Search .............. 425/77, 425/78, 405.1–405.2
    See application file for complete search history.

(56) References Cited

U.S. PATENT DOCUMENTS

| 4,333,902 A | 6/1982 | Hara |
| 4,333,986 A | 6/1982 | Tsuji |
| 4,412,980 A | 11/1983 | Tsuji |
| 4,425,315 A | 1/1984 | Tsuji |
| 4,723,999 A * | 2/1988 | Hasselstrom ............ 419/49 |
| 6,596,225 B1 | 7/2003 | Pope |
| 2005/0044800 A1 | 3/2005 | Hall |
| 2008/0057145 A1 | 3/2008 | Hall |

* cited by examiner

*Primary Examiner* — Richard Crispino
*Assistant Examiner* — Thu Khanh T Nguyen
(74) *Attorney, Agent, or Firm* — Tyson J. Wilde; Philip W. Townsend, III

(57) ABSTRACT

In one embodiment of the present invention, an assembly for HPHT processing comprises a can with an opening. A powder mixture is disposed within the opening. A substrate is disposed within the opening adjacent the powder mixture. Paint is coated on a surface within the opening and opposite the powder mixture with respect to the substrate. A meltable sealant is disposed within the opening and opposite the substrate with respect to the surface and a cap is covering the opening.

9 Claims, 18 Drawing Sheets

Providing an assembly comprising a can with an opening and a mixture disposed within the opening, a substrate being adjacent and above the mixture, a formable sealant barrier positioned above the substrate, a meltable sealant disposed intermediate the sealant barrier and a cap covering the opening

1601

Heating the assembly to a cleansing temperature for a first period of time

1602

Further heating the assembly to a sealing temperature for a second period of time

1603

Fig. 16

FORMABLE SEALANT BARRIER

CROSS REFERENCE TO RELATED APPLICATIONS

This application is a continuation of U.S. patent application Ser. No. 12/512,863; now U.S. Patent Publication No. 2009/0301391 now U.S. Pat. No. 7,927,085; filed on Jul. 30, 2009, which is a continuation-in-part of U.S. patent application Ser. No. 11/469,229; now U.S. Pat. No. 7,575,425; filed on Aug. 31, 2006 and entitled "Assembly for HPHT Processing," which is herein incorporated by reference for all that it contains.

This application also claims priority to U.S. Provisional Patent Application No. 61/164,956 filed on Mar. 31, 2009, and entitled "Formable Sealant Barrier" which is herein incorporated by reference for all that it contains.

BACKGROUND OF THE INVENTION

This invention relates to the production of superhard products such as diamond, polycrystalline diamond, and cubic boron nitride produced by the high pressure and high temperature (HPHT) method. More particularly this invention relates to the HPHT containers or can assemblies in which superhard materials are processed. Superhard materials produced by the HPHT method are generally formed by encapsulating raw ingredients into a container, variously known in the art as a container, a can, an enclosure, a cup, a shield, or a tube.

A meltable sealant may be melted to seal the can. An area of ongoing research within the field of meltable sealant sealing is into methods to prevent the meltable sealant from flowing into the mixture of raw ingredients and causing contamination. One method that may prevent the contamination of the mixture is the use of an anti-wetting material such as stop-off. An anti-wetting material performs the function of arresting the wetting of a liquid onto a solid. With respect to a meltable sealant, an anti-wetting agent may hinder the spread of the melted meltable sealant. Anti-wetting materials have taken the form of a solid plate or disc. However, anti-wetting plates or discs must be precisely cut and shaped to fit into the can to allow for impurities to leave the diamond and to prevent meltable sealant from contaminating the diamond. Additionally, the process of manufacturing and using stop-off discs may be costly and due to improperly fitted discs may lead to low yields.

U.S. Pat. No. 4,333,902 to Hara which is herein incorporated by reference for all that it contains, discloses a process of producing a sintered compact comprising filling a cup with a powdered material to be sintered, putting on an opening of the cup a covering member consisting of a lid and solder so as to permit ventilation between the interior and exterior of the cup to form a cup assembly, applying heat as well as vacuum to the cup assembly to degas the powdered material, melting the solder by the continuation of heat to air-tightly seal the cup with the lid to obtain a closed cup compressible under high pressure at high temperature while maintaining the air-tight seal, and hot-pressing the closed cup to obtain a sintered compact. The covering member may include a porous lid closing the cup and a solder put on the porous lid.

U.S. Pat. No. 4,425,315 to Tsuji, et al. which is herein incorporated by reference for all that it contains, discloses a diamond sintered compact wherein diamond crystal particles are uniformly orientated in a particular direction and the method for producing the same, and has for an object to provide a diamond sintered compact having a high thermal conductivity particularly suitable for heat sink for use in the field of electronics. According to the invention, graphite is used as carbonaceous raw material, diamond crystal particles having such elongated shape that the ratio of the length of the long axis to that of the short axis is more than 2 being synthesized in such state that the greater part of the crystal particles have their long axes uniformly oriented in a particular direction, the crystal particles being sintered in the direction of the long axes thereof so that transformation of the graphite into diamond and sintering thereof may be accomplished synchronously. The invention has for an object to obtain a diamond sintered compact suitable for the aforesaid use by degassing reaction system raw material plugged into an air permeable container by heating it in vacuum in order to intercept gaseous components causing a decrease of thermal conductivity at the time of synthesizing diamond from carbonaceous material and a catalytic metal and sintering thereof, subsequently the air permeable part of the said container being sealed by means of soldering material preliminarily placed in contact with the said container.

U.S. Pat. No. 6,596,225 to Pope, et al. which is herein incorporated by reference for all that it contains, discloses sealing of the can by electron beam welding at high temperature and in a vacuum.

U.S. Patent Publication No. 2005/0044800 to Hall, et al. which is herein incorporated by reference for all that it contains, discloses an assembly for High-Pressure High-Temperature (HPHT) processing comprising a can, a cap, a meltable sealant and sealant barrier, and a superhard mixture comprising superhard particles. The superhard particles may be positioned adjacent a substrate of cemented metal carbide. The can and cap contain the superhard mixture with the sealant barrier positioned within the assembly so as to be intermediate the sealant and at least a portion of the mixture, thereby preventing the sealant from coming in contact with the mixture during processing. The assembly is placed within a vacuum chamber and heated to a temperature sufficient to cleanse the assembly and then melt the sealant providing a hermetic seal for the assembly in preparation for further HPHT processing.

U.S. Patent Publication No. 2008/0057145 to Hall, et al. which is herein incorporated by reference for all that it contains discloses an improved assembly for HPHT processing having a can with an opening and a mixture disposed within the opening. A sealant barrier is positioned atop the mixture. First and second lids are positioned atop the mixture. A meltable sealant positioned intermediate the second lid and a cap covering the opening.

Not withstanding the preceding patents, there remains a need in the art for an easier and more cost effective method of preventing meltable sealant contamination within the can.

BRIEF SUMMARY OF THE INVENTION

In one embodiment of the present invention, an assembly for HPHT processing comprises a can with an opening. A powder mixture is disposed within the opening. A substrate is disposed within the opening adjacent the powder mixture. Paint is coated on a surface within the opening and opposite the mixture with respect to the substrate. A meltable sealant is disposed within the opening and opposite the substrate with respect to the surface and a cap is covering the opening.

The assembly for HPHT processing may further comprise an under lap component between the substrate and the meltable sealant. The under lap component may comprise a disc with a fold along a perimeter. At least a portion of the surface coated with paint may form part of the under lap component.

At least a portion of the surface coated with paint may form an entire exterior of the under lap component. The fold of the disc may comprise an angle of substantially 180 degrees. The assembly for HPHT processing may further comprise a first metal disc disposed intermediate the substrate and the under lap component and a second metal disc disposed opposite the under lap component from the first metal disc. The first metal disc and second metal disc may comprise a melting temperature higher than the melting temperature of the meltable sealant. The first metal disc and second metal disc may be non-reactive with the substrate. At least a portion of the surface coated with paint may form part of the first metal disc. At least a portion of the surface coated with paint may form a periphery of the first metal disc.

The can may comprise a fold around a mouth of the can and may separate the metal disc from the under lap component. A portion of the second metal disc may contact the fold in the can. The fold in the under lap component may be urged by a resilient force against the fold in the can to form a tight seal. The meltable sealant may comprise a material selected from the group consisting of copper, nickel, cobalt, gold, silver, manganese, palladium, titanium, niobium, zinc, phosphorus, boron, aluminum, cadmium, chromium, tin, silicon, tantalum, alloys, compound mixtures, and combinations thereof. The paint may comprise isopropanol, plasticizer, polyethylene glycol, polyvinyl butyral resin, alcohol, anti-wetting material, or combinations thereof. A method of making a paint may comprise providing 500 ml of isopropanol, adding 20 ml of plasticizer and 20 ml of polyethylene glycol to the isopropanol, mixing the isopropanol, plasticizer and polyethylene glycol, further adding 40 gm of polyvinyl butyral resin and 400 ml of isopropanol, shaking all ingredients until all the polyvinyl butyral resin is dissolved and adding 1 gm of stop off per ml of all ingredients.

In another embodiment of the present invention, a method of sealing an assembly for HPHT processing comprises a can with an opening. A powder mixture is disposed within the opening. A substrate is disposed within the opening adjacent the powder mixture. A meltable sealant is disposed within the opening and opposite the powder mixture with respect to the substrate. A cap covers the opening. A surface within the opening and between the meltable sealant and the substrate is coated with paint. The can is heated such that a substantial portion of impurities are driven from the can. The can is further heated such that the meltable sealant melts. The meltable sealant is blocked from accessing the powder mixture with the paint and the can is cooled such that the meltable sealant solidifies. The coating of the surface with paint may comprise dipping the surface into paint before disposing it inside the can. The coating the surface with paint may comprise applying the paint on the surface with a paintbrush. The coating the surface with paint may comprise applying the paint on the surface with a swab.

In another embodiment of the present invention, an assembly for HPHT processing comprises a can with an opening, a powder mixture disposed within the opening, a substrate disposed within the opening adjacent and above the powder mixture, a formable sealant barrier within the opening above the substrate, a meltable sealant within the opening above the formable sealant barrier, and a cap covering the opening.

In another embodiment of the present invention, the assembly may comprise a can with an opening, a powder mixture disposed within the opening, a substrate disposed within the opening adjacent and above the powder mixture, a first layer of formable sealant barrier within the opening above the substrate, a lower niobium disc within the opening above the first layer of formable sealant barrier, a second layer of formable sealant barrier within the opening above the lower niobium disc, an under lap component within the opening above the second layer of formable sealant barrier, a steel disc within the opening above the underlap component, a meltable sealant within the opening above the steel disc, and cap placed on the assembly. The can may additionally comprise a fold. The fold may form a lid within the can.

In another embodiment, the assembly may comprise a ram disposed within the opening adjacent the formable sealant barrier. The ram may displace a portion of the formable sealant barrier.

The formable sealant barrier may comprise a formable structure such as a powder, a gel, an oil, a putty, or a combination thereof. The formable sealant barrier may also comprise a composition of aluminum oxide or boron nitride.

The meltable sealant may be a material selected from the group consisting of copper, nickel, cobalt, gold, silver, manganese, palladium, titanium, niobium, zinc, phosphorus, boron, aluminum, cadmium, chromium, tin, silicon, tantalum, alloys, compound mixtures, and combinations thereof having a melting point, or melting range, at least partially higher than the temperature required to cleanse the assembly.

In another embodiment of the present invention, a method of preparing an assembly for HPHT processing uses the steps of providing an assembly comprising a can with an opening and a powder mixture disposed within the opening, a substrate being adjacent and above the powder mixture, a formable sealant barrier positioned above the substrate, a meltable sealant disposed intermediate the sealant barrier and a cap covering the opening; next heating the assembly to a cleansing temperature for a first period of time; then further heating the assembly to a sealing temperature for a second period of time.

The assembly may be heated in a vacuum. The assembly may be further heated in an inert gas and brought back to atmospheric pressure at a temperature sufficient to melt the sealant.

The cleansing temperature may be between 800° C. and 1050° C. The sealing temperature may be between 1000° C. and 1200° C. The first period of time may be between 15 minutes and 60 minutes and the second period of time may be between 2 minutes and 25 minutes.

BRIEF DESCRIPTION OF THE DRAWINGS

FIG. 16 is a flow chart of an embodiment for a method of preparing an assembly for HPHT processing.

DETAILED DESCRIPTION OF THE INVENTION AND THE PREFERRED EMBODIMENT

It is to be appreciated that directional language used throughout this application, such as above or below, is with reference to the figures and is not limiting of the claims. In practice, embodiments may be oriented differently from the orientations shown in the figures.

Figure 1:
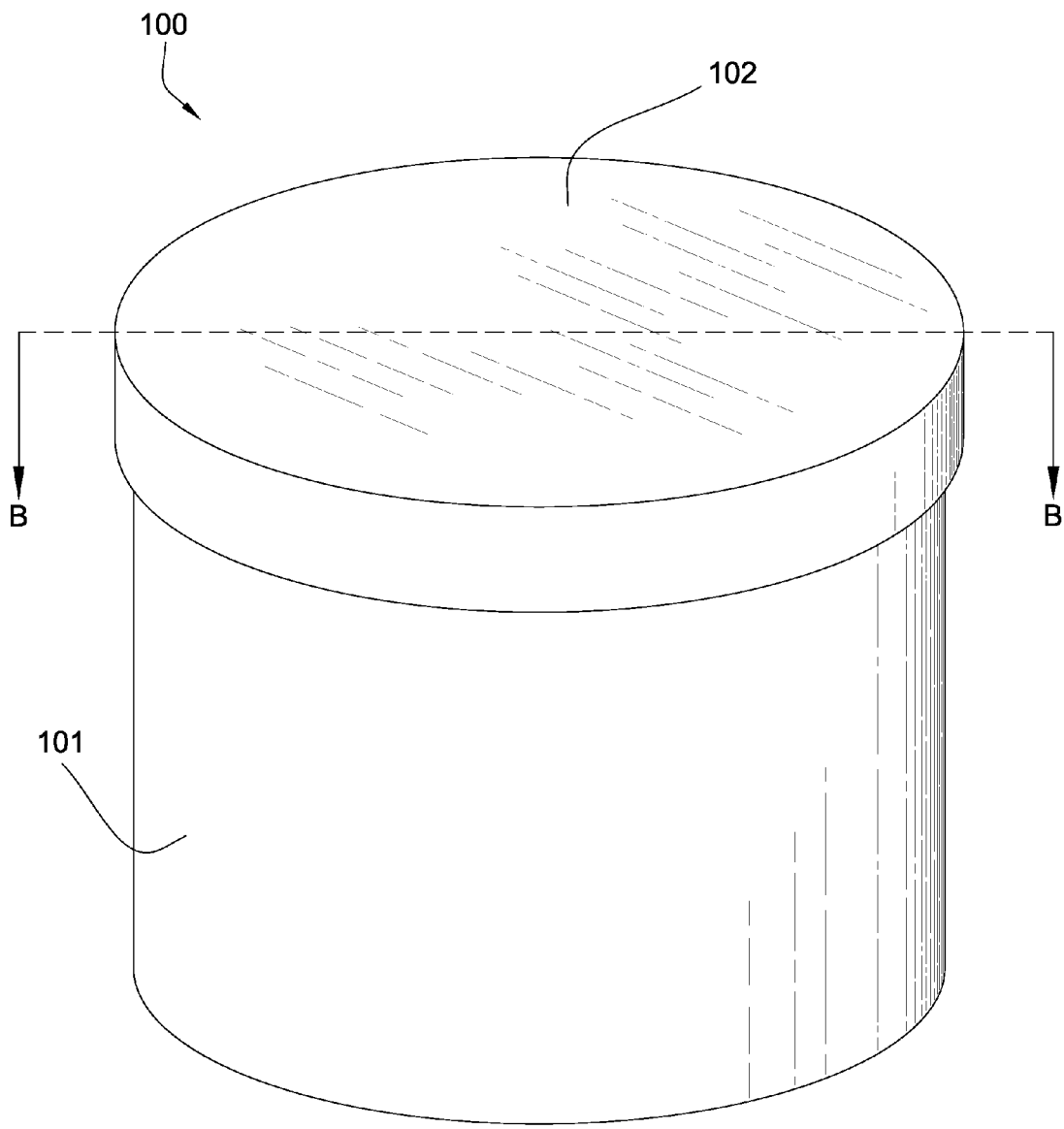
FIG. 1 is a perspective diagram of an embodiment of an assembly for HPHT processing.

Referring now to the figures, FIG. 1 is a perspective diagram of an embodiment of a high pressure high temperature (HPHT) processing assembly 100 comprising a can 101 with a cap 102. The assembly 100 may be used in the process of creating superhard particles such as polycrystalline diamond. In an HPHT process, the assembly 100 may be heated in a vacuum to remove impurities from the can 101, including oxygen. Once the assembly 100 has been sufficiently purified, the can 101 may then be further heated to seal the cap 102 onto the can 101 creating a sterile environment within the can 101. The assembly 100 may then be placed in a cube adapted to sit in a chamber of an HPHT apparatus. High pressure and temperature may then be applied to the assembly 100 to sinter the contents of the can 101. The sintered can assembly 100 may be used in drill bits, shear bits, roller cone bits, cone crushers, mining machines, picks, or combinations thereof.

At least a portion of the can 101 may comprise niobium, a niobium alloy, a niobium blend, or combinations thereof. At least a portion of the cap 102 may comprise a metal or metal alloy. Line BB describes the plane of the cross section of some of the subsequent figures.

Figure 2:
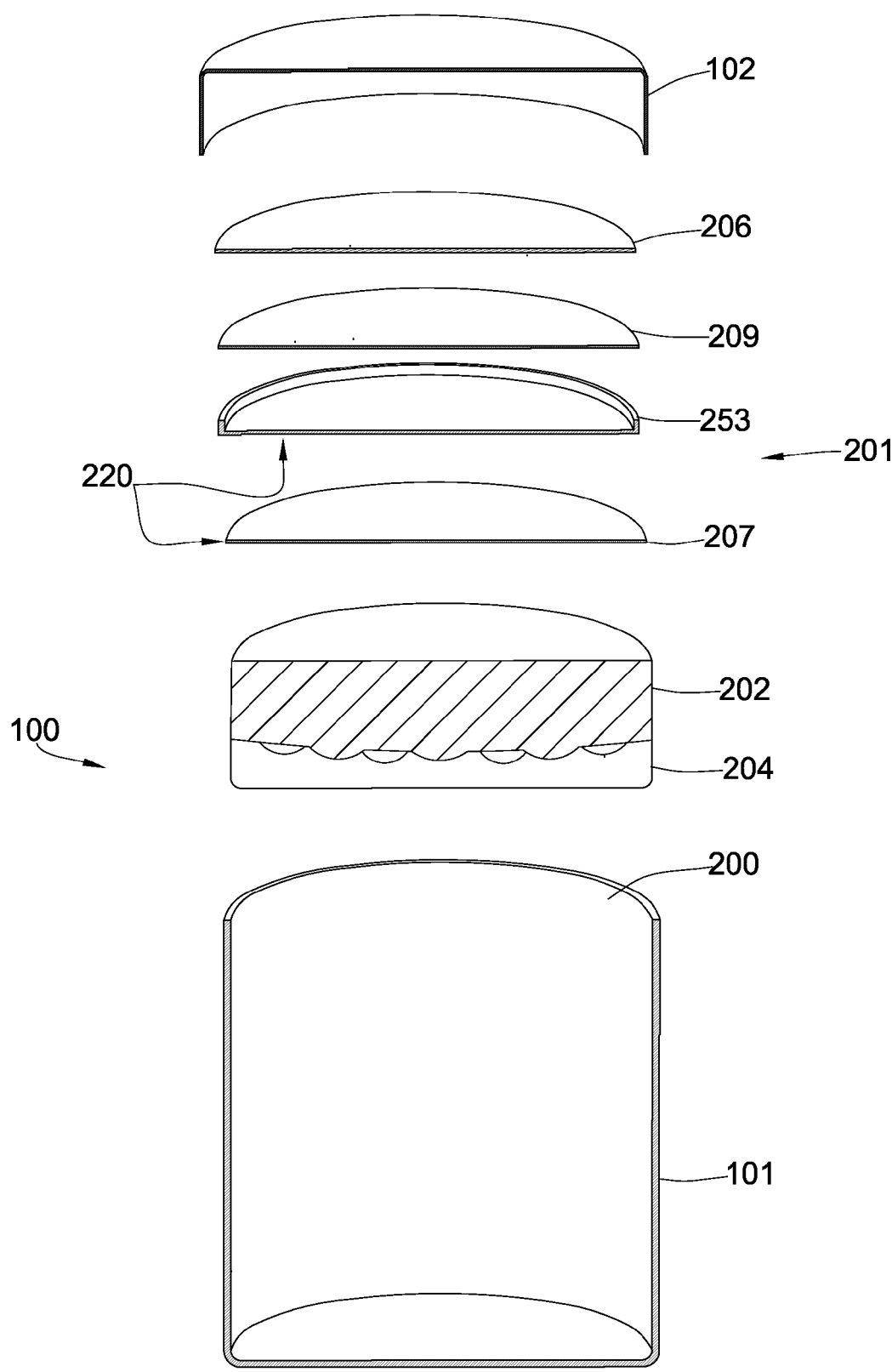
FIG. 2 is an exploded cross-sectional diagram of another embodiment of an assembly for HPHT processing.

FIG. 2 is an exploded cross-sectional diagram of an embodiment of a HPHT processing assembly 100. The assembly 100 may comprise a can 101, a powder mixture 204 comprising a superhard material and a substrate 202 comprising tungsten carbide, calcium carbide, silicon carbide, cementite, boron carbide, tantalum carbide, titanium carbide, or combinations thereof. The superhard material may comprise diamond, polycrystalline diamond with a binder concentration of 1 to 40 weight percent, cubic boron nitride, refractory metal bonded diamond, silicon bonded diamond, layered diamond, infiltrated diamond, thermally stable diamond, natural diamond, vapor deposited diamond, physically deposited diamond, diamond impregnated matrix, diamond impregnated carbide, monolithic diamond, polished diamond, course diamond, fine diamond, non-metal catalyzed diamond, cemented metal carbide, chromium, titanium, aluminum, tungsten, or combinations thereof. The assembly 100 may further comprise a first metal disc 207 and second metal disc 209, an under lap component 253, a meltable sealant 206 and a cap 102. The first metal disc 207 may comprise niobium. The second metal disc 209 and the cap 102 may comprise steel. The meltable sealant 206 may comprise a material selected from the group consisting of copper, nickel, cobalt, gold, silver, manganese, palladium, titanium, niobium, zinc, phosphorus, boron, aluminum, cadmium, chromium, tin, silicon, tantalum, alloys, compound mixtures, and combinations thereof having a melting point, or melting range, at least partially higher than the temperature required to cleanse the assembly 100. The meltable sealant 206 may have a melting point above the temperature at which contaminants leave the mixture 204.

The assembly 100 may comprise a can 101 with an opening 200. A powder mixture 204 may be disposed within the opening 200. A substrate 202 may be disposed within the opening 200 adjacent the powder mixture 204. A first metal disc 207 may be placed within the opening 200 and opposite the mixture 204 with respect to the substrate 202. A second metal disc 209 may be placed opposite the first metal disc 207 with respect to the under lap component 253. A meltable sealant 206 may be disposed within the opening 200 on top of the second metal disc 209. A cap 102 may cover the opening 200 of the can 101.

The can 101 may then be heated to remove the impurities present in the powder mixture 204. After contaminants have left the powder mixture 204 the temperature may then be raised such that the meltable sealant 206 begins to melt. The meltable sealant 206 may seal the can 101 by binding the cap 102 to the walls of the can 101. It is believed that this seal may be able to maintain a sterile vacuum within the can 101. The sterile vacuum will in turn prevent the recontamination of the powder mixture 204.

The assembly 100 may further comprise paint coated on a surface 220 within the opening 200 and opposite the powder mixture 204 with respect to the substrate 202. At least a portion of the surface 220 coated with paint may form part of the under lap component 253. The under lap component 253 may be dipped into the paint. Similarly, at least a portion of the surface 220 coated with paint may form a part of the first metal disc 207. In one embodiment, the periphery of the first metal disc 207 may be coated with paint.

Figure 3A:
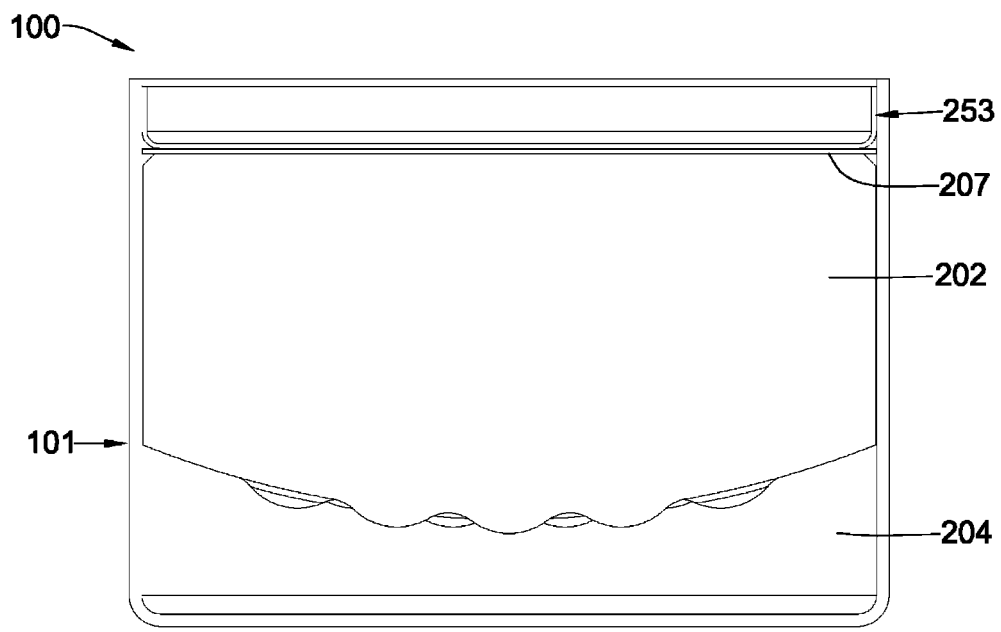
FIG. 3a is a cross-sectional diagram of another embodiment of an assembly for HPHT processing.
Figure 3B:
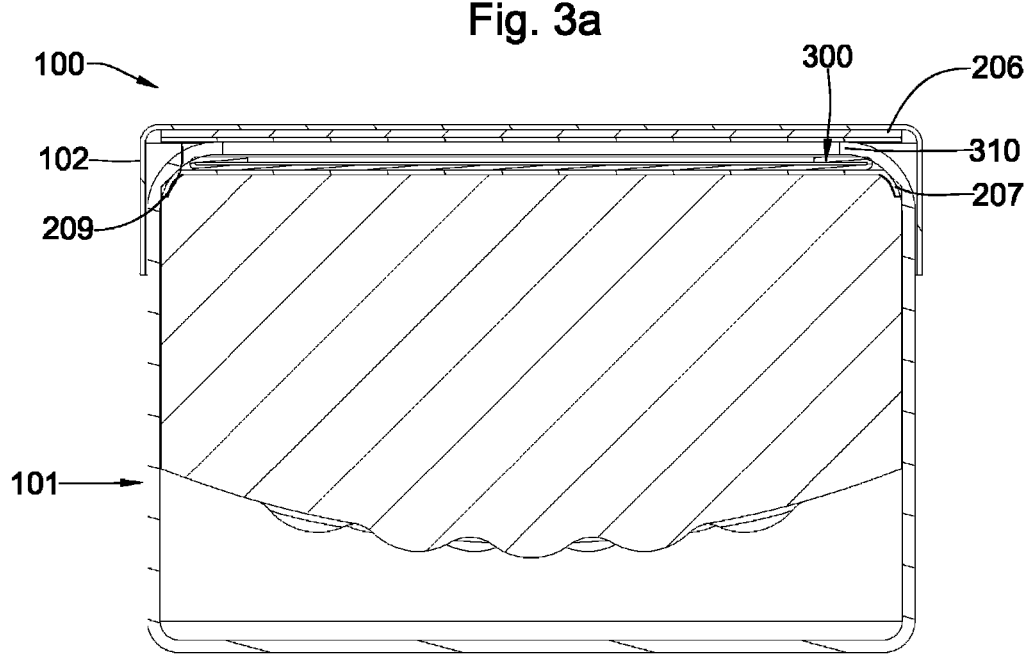
FIG. 3b is a cross-sectional diagram of another embodiment of an assembly for HPHT processing.

Referring to FIGS. 3a and 3b, a cross-sectional diagram of an embodiment of a HPHT processing assembly 100 is disclosed. The assembly 100 may comprise a powder mixture 204, a substrate 202, a first metal disc 207 and second metal disc 209, an under lap component 253, a meltable sealant 206 and a cap 102 covering the can 101. Initially, the can 101 may comprise an under lap component 206 without any fold as illustrated in FIG. 3a. During HPHT processing, an edge of the under lap component 253 may be rolled thereby forming a fold 300 as shown in FIG. 3b. The fold 300 may comprise an angle of substantially 180 degrees. The can 101 may also comprise a fold 310 around its mouth and may separate the second metal disc 209 from the under lap component 253. The fold 300 in the under lap component 253 may be urged by a resilient force against the fold 310 in the can 101 to form a tight seal.

Figure 4A:
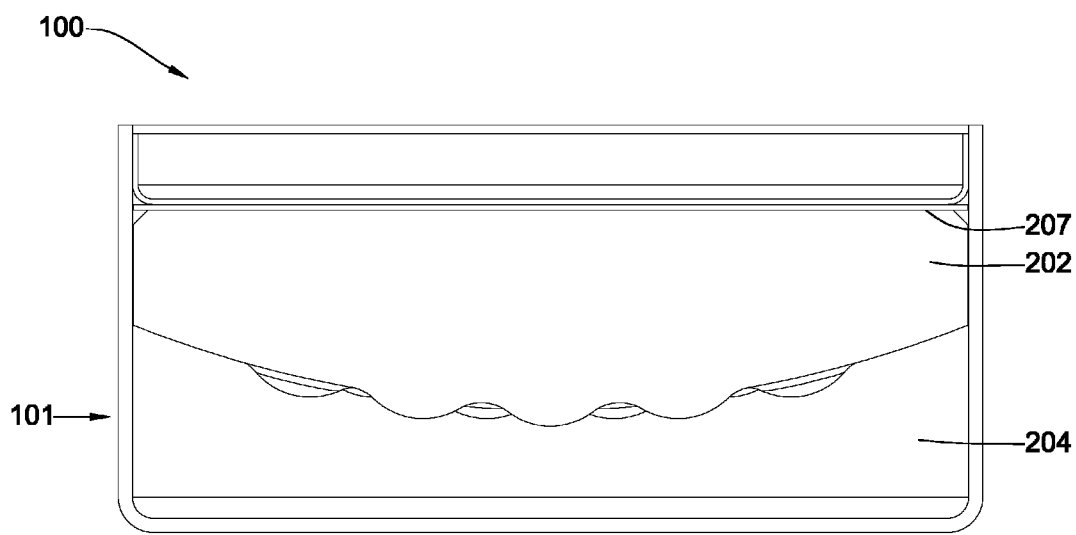
FIG. 4a is a cross-sectional diagram of another embodiment of an assembly for HPHT processing.
Figure 4B:
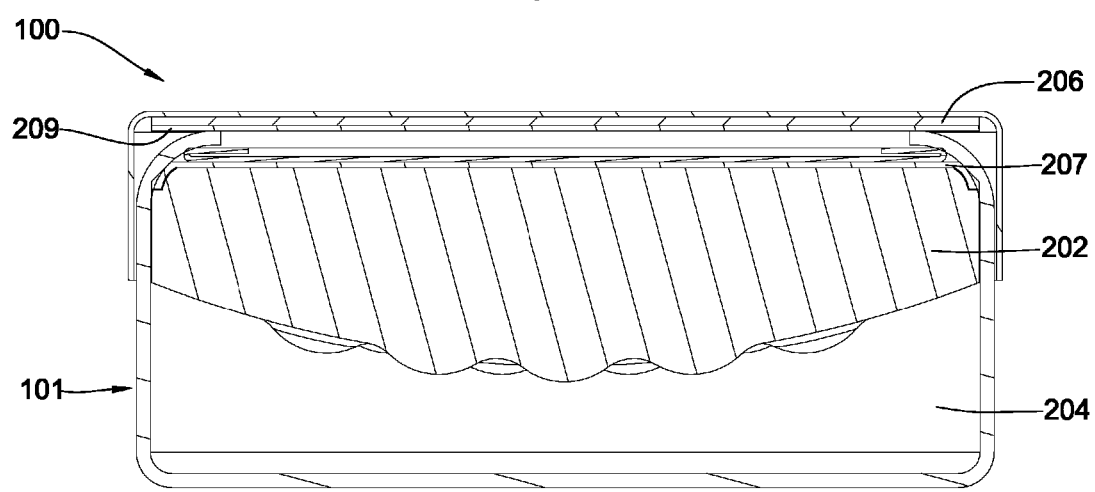
FIG. 4b is a cross-sectional diagram of another embodiment of an assembly for HPHT processing.

FIGS. 4a and 4b are cross-sectional diagrams of another embodiment of an HPHT processing assembly 100. The assembly 100 may comprise a first metal disc 207 and second metal disc 209 comprising a melting temperature higher than the meltable sealant 206. The first metal disc 207 and second metal disc 209 are believed to be nonreactive with the substrate 202. The first metal disc 207 and the under lap component 253 may comprise niobium, tantalum, or combinations thereof.

Figure 5:
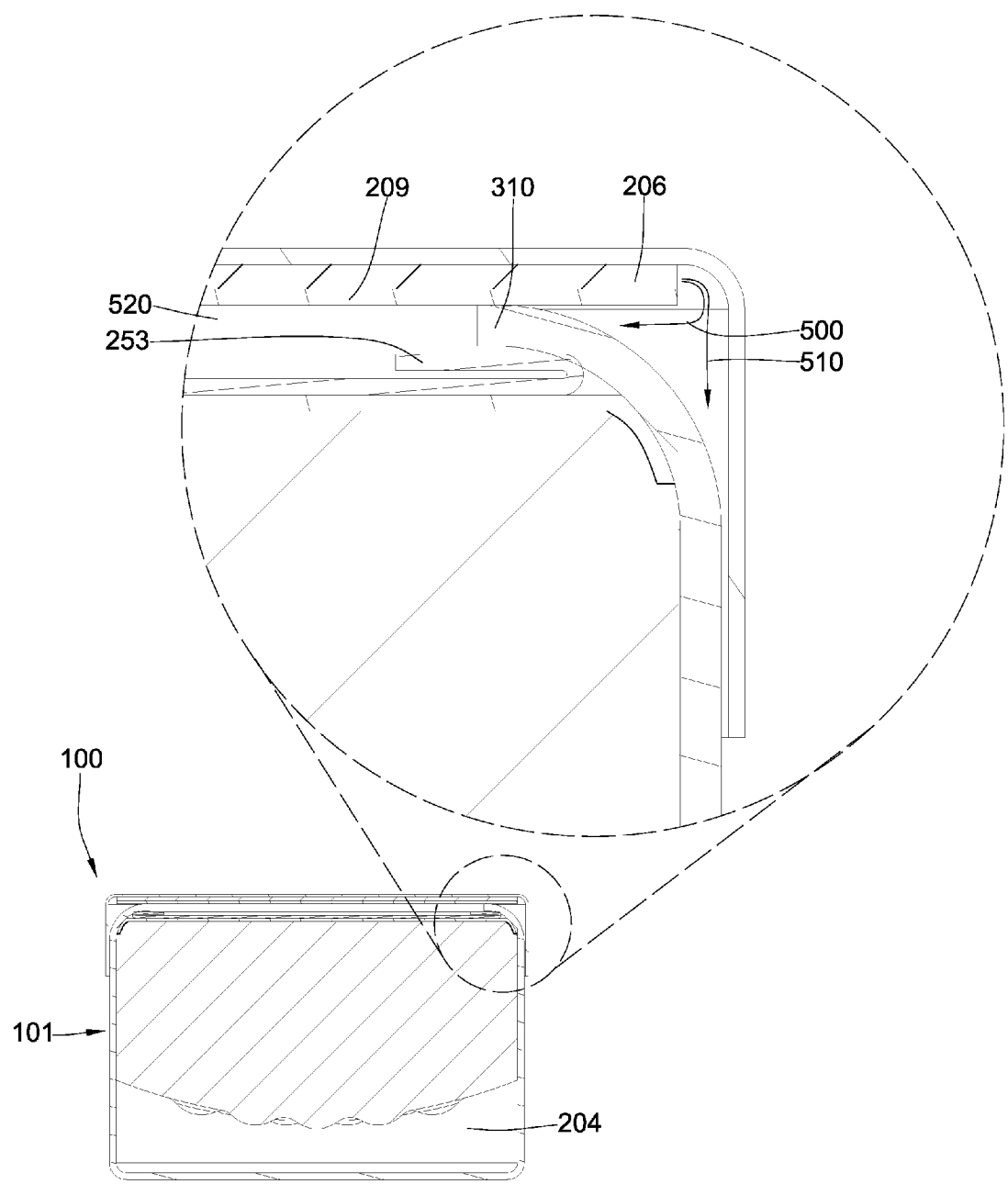
FIG. 5 is a cross-sectional diagram of another embodiment of an assembly for HPHT processing.

FIG. 5 is a cross-sectional diagram of another embodiment of an HPHT processing assembly 100. The assembly 100 may comprise a meltable sealant 206 disposed within the can 101. The can 101 may be heated to a melting temperature of the meltable sealant 206 after removing most of the impurities from the powder mixture 204. The meltable sealant 206 may flow in the directions of the arrows 500 and 510 as shown in the figure, thereby sealing the can 101. A portion of the second metal disc 209 may contact the fold 310 in the can 101. The can 101 may comprise a gap 520 intermediate the under lap component 253 and the second metal disc 209.

Figure 6:
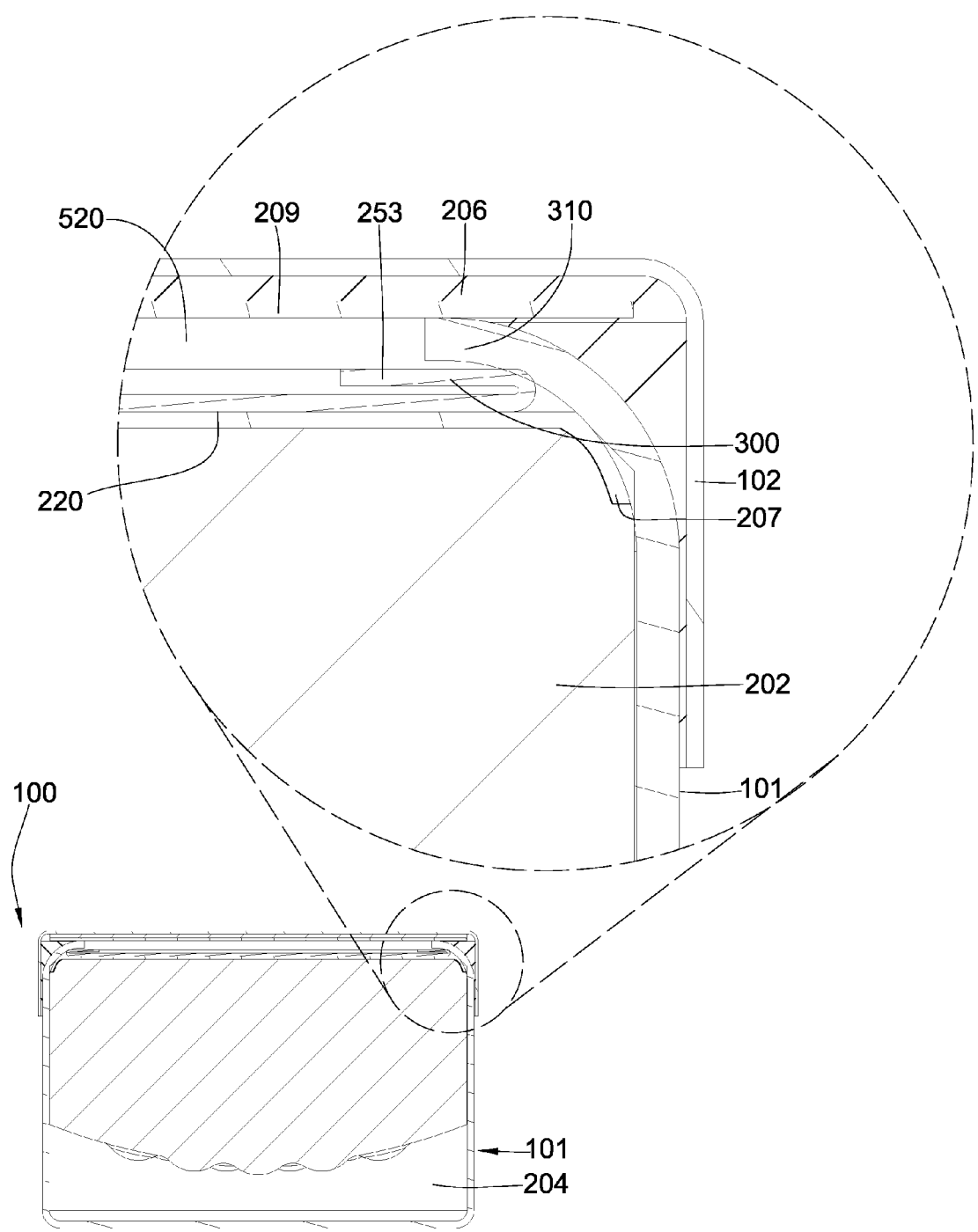
FIG. 6 is a cross-sectional diagram of another embodiment of an assembly for HPHT processing.

FIG. 6 is a cross-sectional diagram of another embodiment of an HPHT processing assembly 100. The meltable sealant 206 may flow in the directions of the arrows as illustrated in FIG. 5 and seep through areas of contact between the can 101 and the cap 102, and between the second metal disc 209 and the fold 310 in the can 101. The meltable sealant 206 may seep through the areas of contact by capillary action. The meltable sealant 206 may reach the gap 520 intermediate the under lap component 253 and the second metal disc 209. The exterior surface of the under lap component 253 may comprise a surface 220 coated with paint. The tight seal formed by the fold 310 in the can 101 and the fold 300 in the under lap component 253 may prevent the meltable sealant 206 from accessing the powder mixture 204. Furthermore, the surface 220 coated with paint may prevent the meltable sealant 206 from entering the substrate 202, thereby preventing any kind of recontamination of the powder mixture 204.

Figures 7A, 7B:
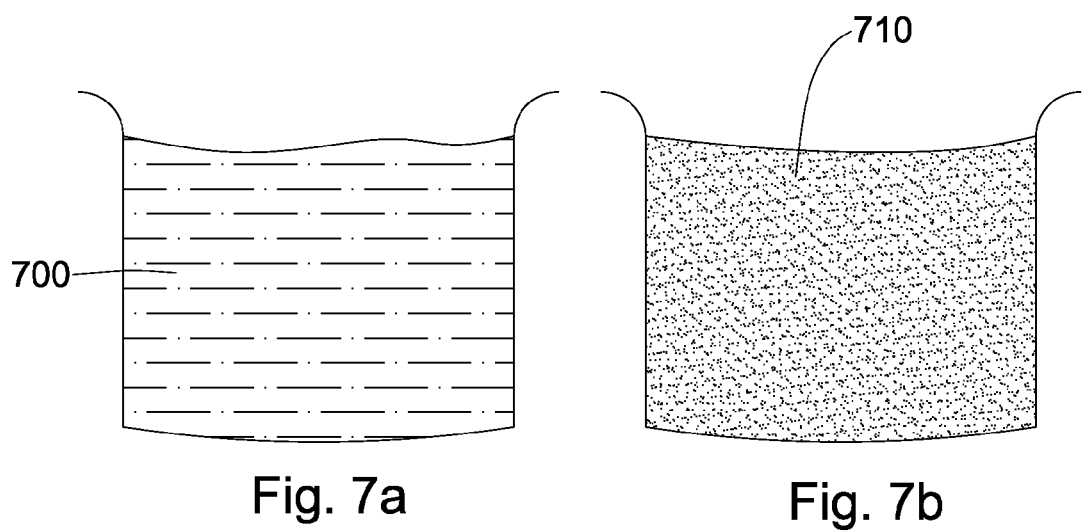
FIG. 7a is a cross-sectional diagram of an embodiment of a container filled with paint.
FIG. 7b is a cross-sectional diagram of an embodiment of a container filled with stop off.

FIGS. 7a and 7b are cross-sectional diagrams of embodiments of containers filled with paint 700 and filled with stop off 710 respectively. The paint 700 may comprise isopropanol, plasticizer, polyethylene glycol, polyvinyl butyral resin, alcohol, anti-wetting material, or combinations thereof. A method of making the paint 700 comprises filling a 1000 ml neoprene bottle with 500 ml of isopropanol. Further adding 20 ml of plasticizer and 20 ml of polyethylene glycol into the neoprene bottle and mixing together. Further mixing 40 gm of polyvinyl butyral resin and 400 ml of isopropanol and shaking until all the polyvinyl butyral resin is dissolved. Finally adding 1 gm of stop off 710 per ml of all ingredients. It is to be remembered that stop off 710 should be added an hour prior to using the paint 700. It is believed that leaving the paint 700 with stop off 710 for more than an hour may result in separation of the ingredients.

Figure 8A:
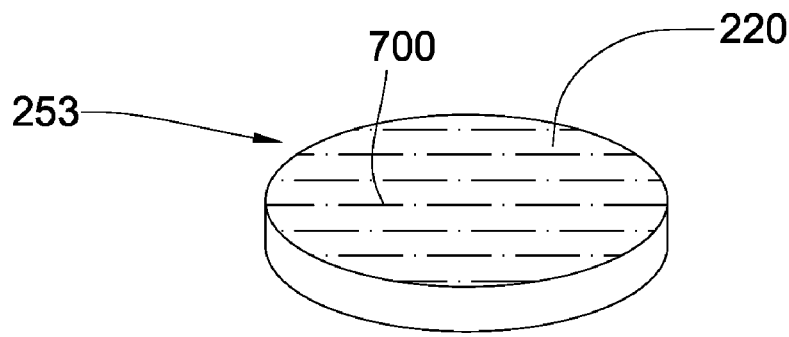
FIG. 8a is a perspective diagram of an embodiment of an under lap component.
Figure 8B:
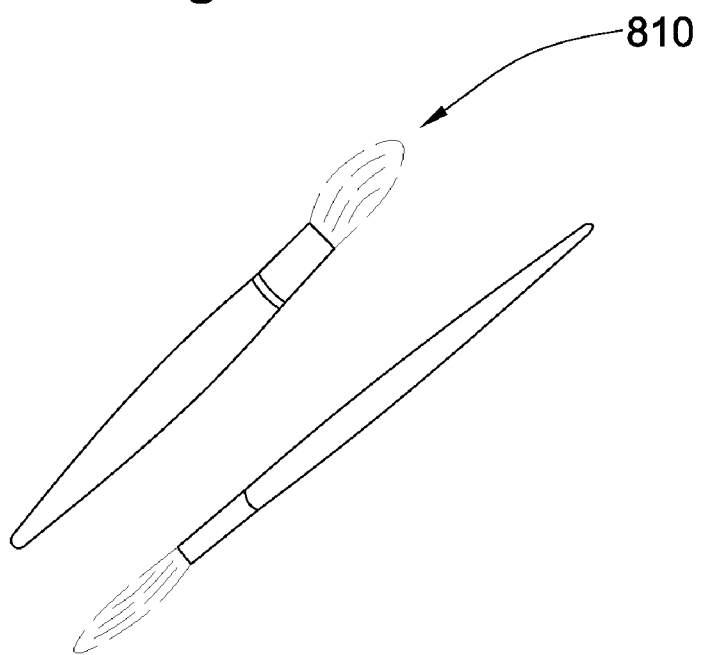
FIG. 8b is a perspective diagram of an embodiment of a paintbrush.
Figure 8C:
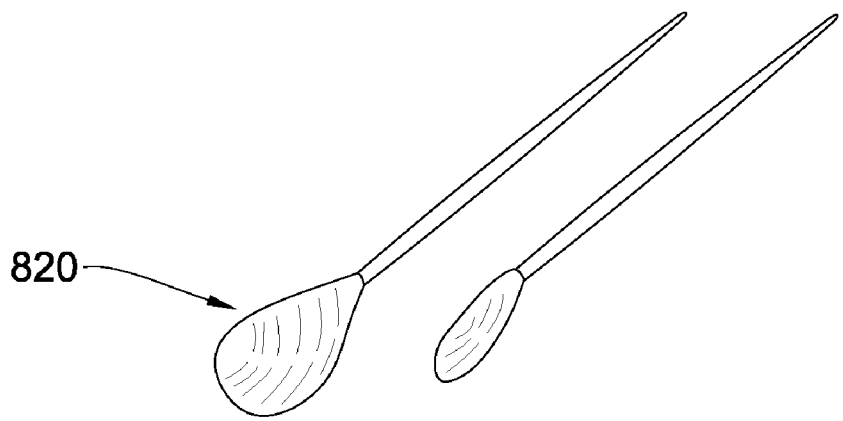
FIG. 8c is a perspective diagram of an embodiment of a swab.

FIG. 8a is a perspective diagram of an embodiment of an under lap component 253 before rolling and forming a fold 300. The underside or exterior portion of the under lap component 253 may comprise a surface 220 coated with paint 700. FIG. 8b is a perspective diagram of an embodiment of paintbrush 810. The paintbrush 810 may be used to coat the surface 220 with paint 700. The paint 700 is believed to stay solid after 5 to 10 minutes of application. A surface 220 may also be coated with paint 700 using a cotton swab 820 as shown in FIG. 8c.

Figure 9A:
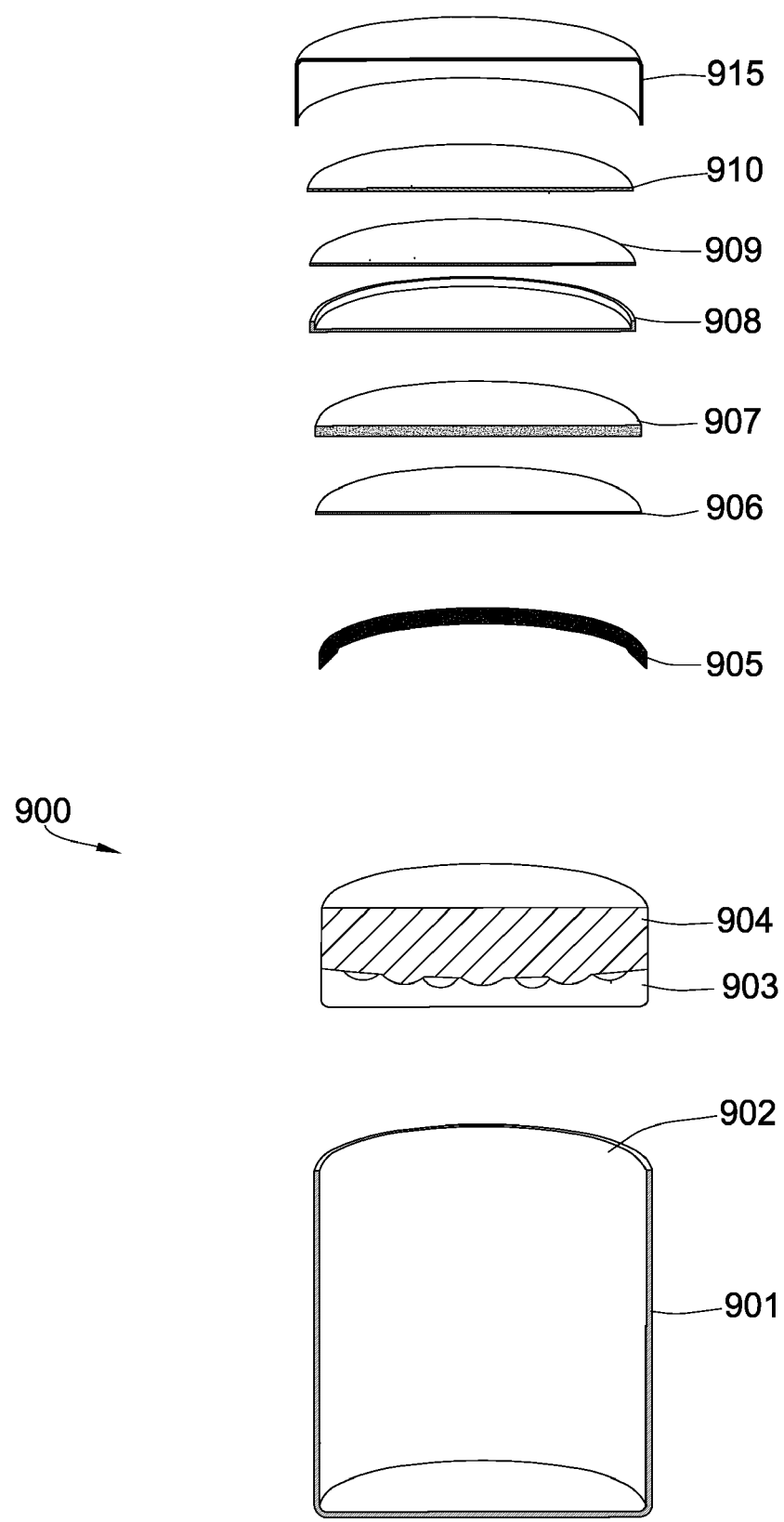
FIG. 9a is a cross-sectional diagram of another embodiment of an assembly for HPHT processing.

FIG. 9a is an exploded cross-sectional diagram of an embodiment of an assembly 900 for HPHT processing. The assembly 900 comprises a can 901 with an opening 902. A plurality of superhard particles 903 may be disposed within the opening 902 followed by a substrate 904. A first layer of a formable sealant barrier 905 may lie above and adjacent to the substrate 904. The first layer of formable sealant barrier 905 may lie substantially around the perimeter of the substrate 904. A lower niobium disc 906 may lie adjacent and above the first layer of sealant barrier 905. A second layer of formable sealant barrier 907 may lie above the lower niobium disc 906. An under lap component 908 may lie above the second layer of sealant barrier 907. The under lap component 908 may be coated in an anti-wetting material. A metal disc 909 may lie adjacent to and above the under lap component 908. A meltable sealant 910 may lie adjacent to and above the metal disc 909. A cap 915 may cover the opening 902 of the can 901.

The metal disc 909 and cap 915 may comprise steel. The metal disc 909 and cap 915 may aid the meltable sealant 910 in sealing the can 901 by forming a eutectic mixture with the meltable sealant 910.

The meltable sealant 910 may comprise a material selected from the group consisting of copper, nickel, cobalt, gold, silver, manganese, palladium, titanium, niobium, zinc, phosphorus, boron, aluminum, cadmium, chromium, tin, silicon, tantalum, alloys, compound mixtures, and combinations thereof having a melting point, or melting range, at least partially higher than the temperature required to cleanse the assembly. The meltable sealant 910 may have a melting point above the temperature at which contaminants begin to leave the can 901. After a substantial amount of contaminants have left the can 901 the temperature may then be raised such that the meltable sealant 910 begins to melt. The meltable sealant 910 may seal the can closed by binding the cap 915 to the can 901. It is believed that this seal may be able to maintain a sterile vacuum within the can 901. The sterile vacuum will in turn prevent recontamination.

One embodiment of a meltable sealant 910 may comprise a copper disc. The process of using copper to seal the assembly is known in the art. Copper functions as a sealant due to its melting temperature relative to the temperature at which contaminants escape the assembly 900. Copper melts at a temperature of 1084.62° C., which may be a higher temperature than the temperature required to remove impurities from the assembly 900. The higher melting temperature of copper may allow for the temperature of the assembly 900 to be raised such that contaminants exit the assembly 900. The temperature may then be further raised causing the copper to melt and seal the assembly 900.

The first layer of formable sealant barrier 905 may comprise a formable anti-wetting material. In one embodiment, the first layer of formable sealant barrier 905 may comprise a boron nitride powder. In the past, a sealant barrier comprising stop-off which contains aluminum oxide was placed adjacent to the carbide substrate 904. It is believed that the aluminum oxide reacted negatively with the carbide substrate 904 causing cracking and weakness within the carbide substrate 904. It is further believed that boron nitride may function as an anti-wetting material and may not react negatively with the carbide substrate 904. The first layer of sealant barrier 905 may allow contaminants to flow through the barrier while functioning as an anti-wetting agent and preventing the inflow of a meltable sealant 910 into the superhard particles 903.

The second layer of sealant barrier 907 may comprise aluminum oxide. A powder that comprises aluminum oxide that may be used is stop-off. A suitable powder stop-off is manufactured under the brand name Nicrobraz by the Wall Colmonoy Corporation, 101 W. Girard, Madison Heights, Mich. 48071. It is believed that stop-off comprising aluminum oxide may function as a better sealant barrier than boron nitride, however due to the possible negative reaction between aluminum oxide and carbide the stop-off may be isolated to the second layer of sealant barrier 907.

Figure 9B:
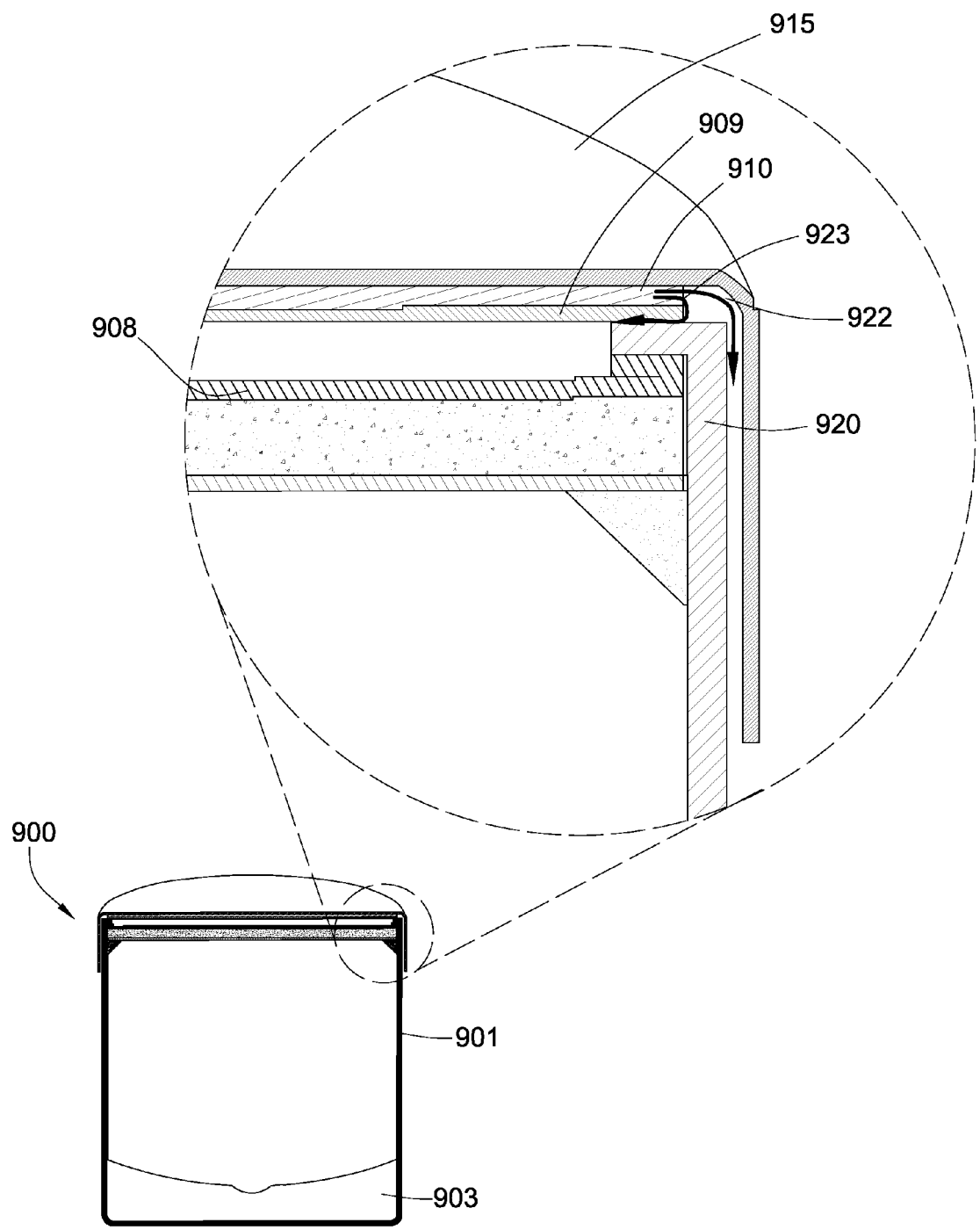
FIG. 9b is a cross-sectional diagram of another embodiment of an assembly for HPHT processing.

FIG. 9b depicts a close-up cross-sectional view of an embodiment of an assembly 900 for HPHT processing. After the various components are inserted into the assembly 900 a portion of the can wall 920 may be folded inward over the sides of the under lap component 908 causing the two sides to fold inward together. It is believed that having both the can 901 and the under lap component 908 folded inward that the pathway for contamination to the superhard particles 903 will be more torturous. The assembly 900 in FIG. 9b has not yet been heated. The meltable sealant 910 comprises a disc lying directly below the cap 915. A first arrow 922 and a second arrow 923 depict the directions that the meltable sealant 910 may flow if the meltable sealant 910 is melted. The first arrow 922 depicts the potential of the meltable sealant 910 flowing intermediate the cap 915 and the can wall 920. The second arrow 923 depicts the potential of the meltable sealant 910 flowing between the under lap component 908 and the steal disc 909.

Figure 9C:
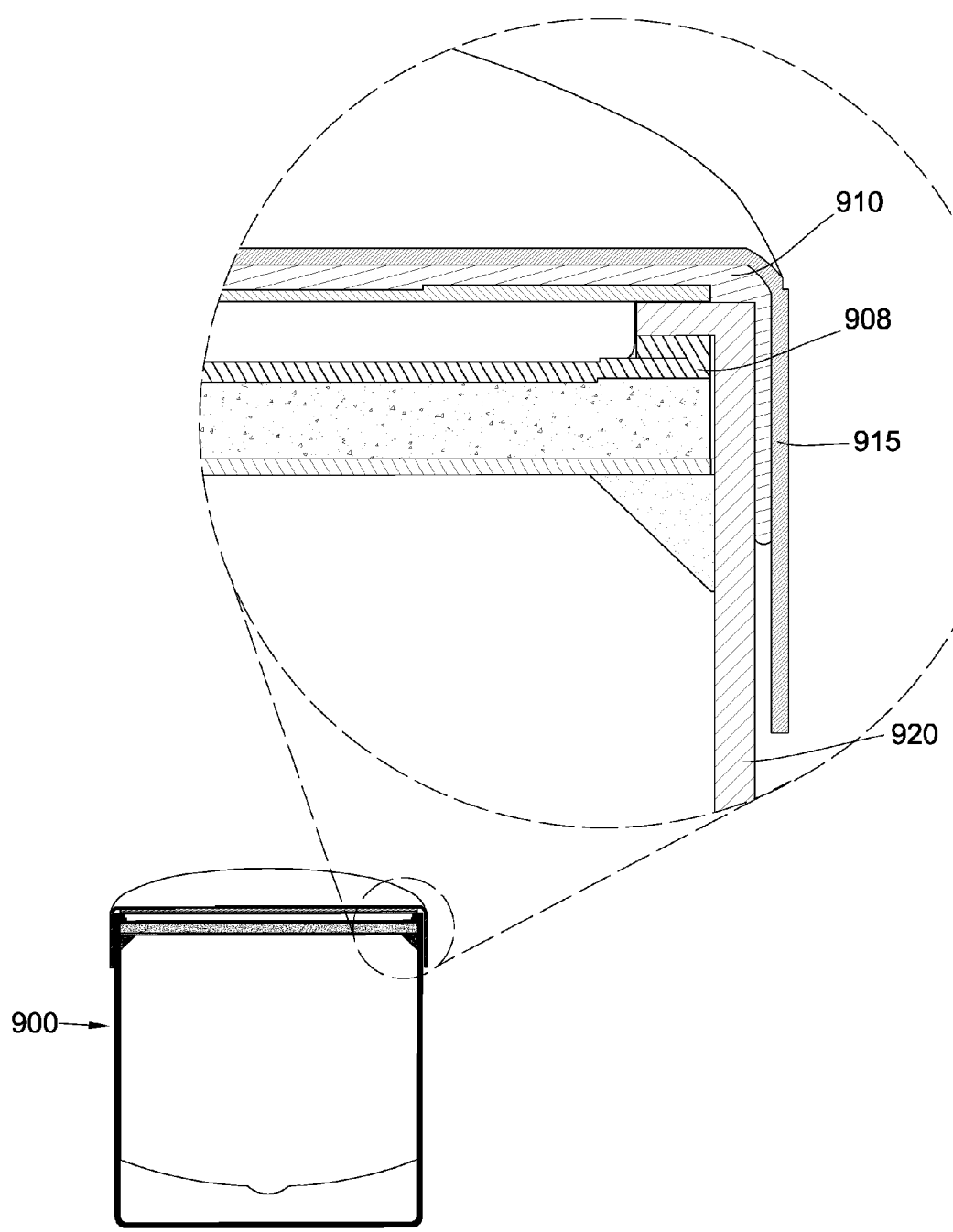
FIG. 9c is a cross-sectional diagram of another embodiment of an assembly for HPHT processing.

FIG. 9c depicts a close-up cross-sectional view of an embodiment of an assembly 900 for HPHT processing. The assembly 900 in FIG. 9c has been heated such that the meltable sealant 910 has melted. The meltable sealant 910 is shown disposed between the can wall 920 and the cap 915. It is also shown that the meltable sealant 910 was not able to flow past the under lap component 908.

Figure 10:
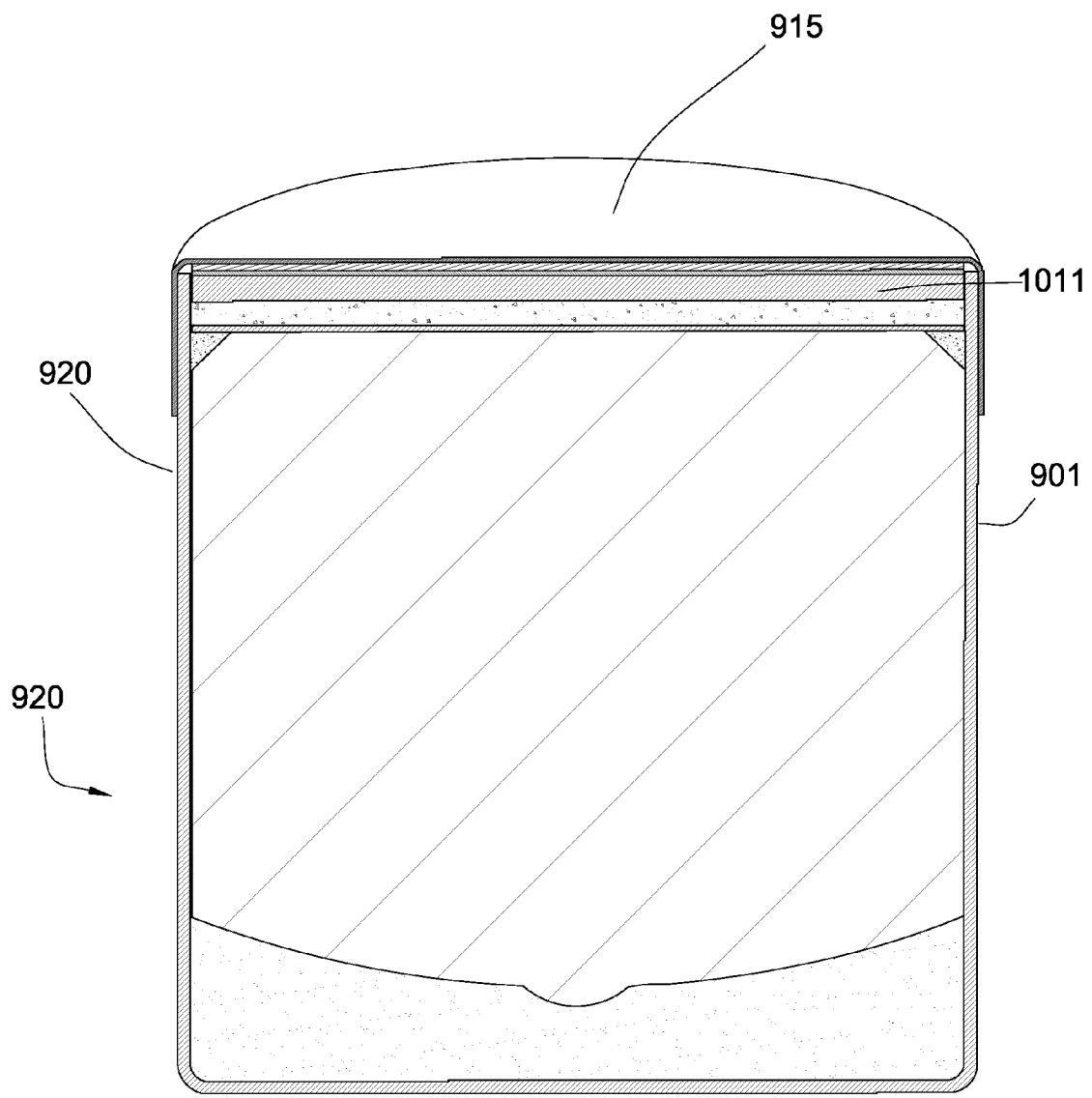
FIG. 10 is a cross-sectional diagram of another embodiment of an assembly for HPHT processing.

FIG. 10 displays a cross-sectional view of an embodiment of an assembly 900 for HPHT processing similar in configuration to that shown in FIG. 9a except that the can 901 comprises an upper niobium disc 1011 instead of an under lap component. In this embodiment, the can walls 920 may remain unfolded. It is believed that the cap 915 may provide a seal with the can wall 920 after the meltable sealant 910 has been melted.

Figure 11:
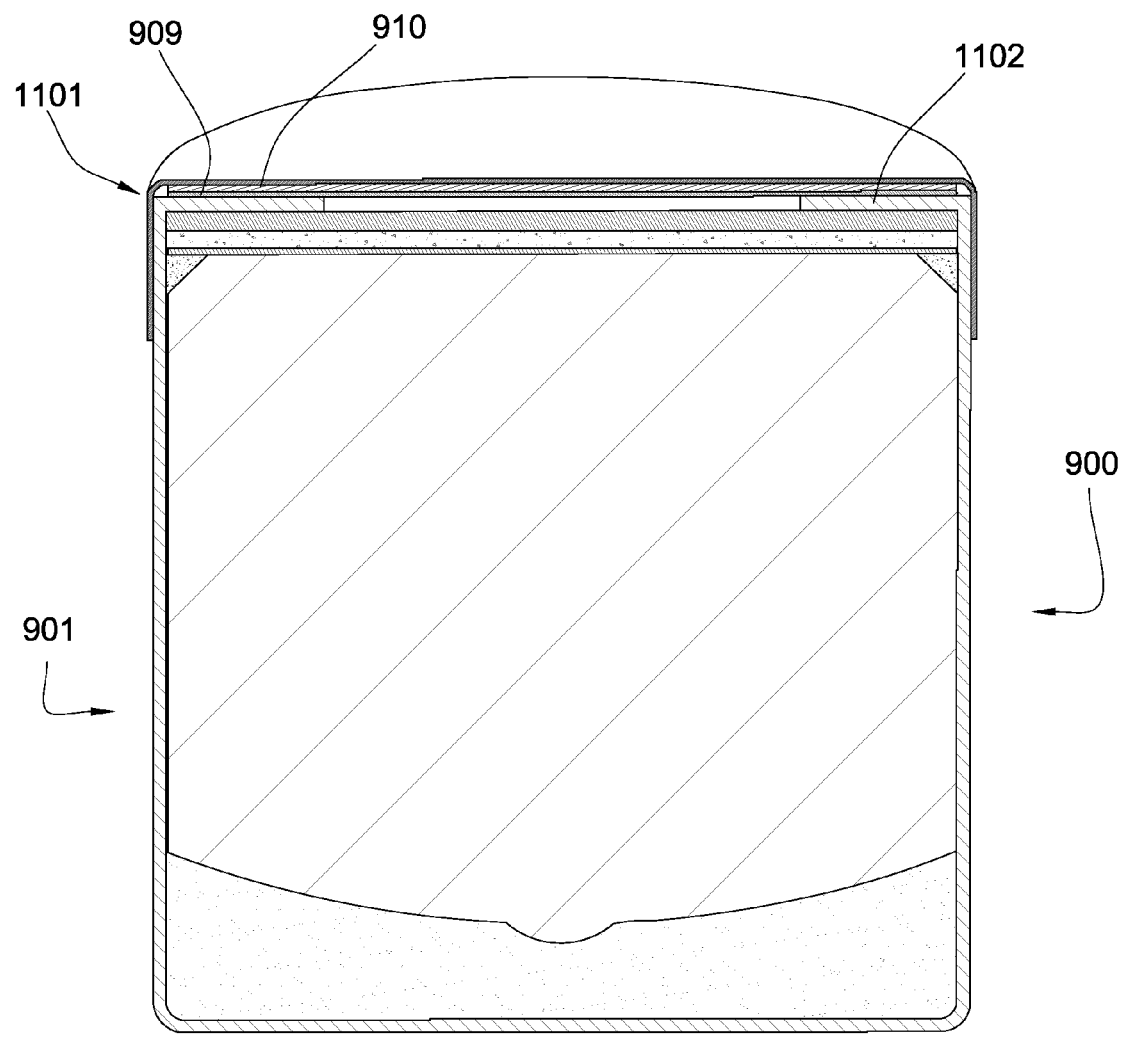
FIG. 11 is a cross-sectional diagram of another embodiment of an assembly for HPHT processing.

FIG. 11 displays a cross-sectional view an embodiment of an assembly 900 for HPHT processing similar in configuration to that shown in FIG. 9a except that the can 901 comprises a fold 1101. The fold 1101 on the can 901 may create a lid 1102 to the can 901. In this embodiment, the metal disc 909 and meltable sealant 910 lie above the lid 1102. It is believed that the lid 1102 may provide for a better seal after the meltable sealant 910 has been melted.

Figure 12:
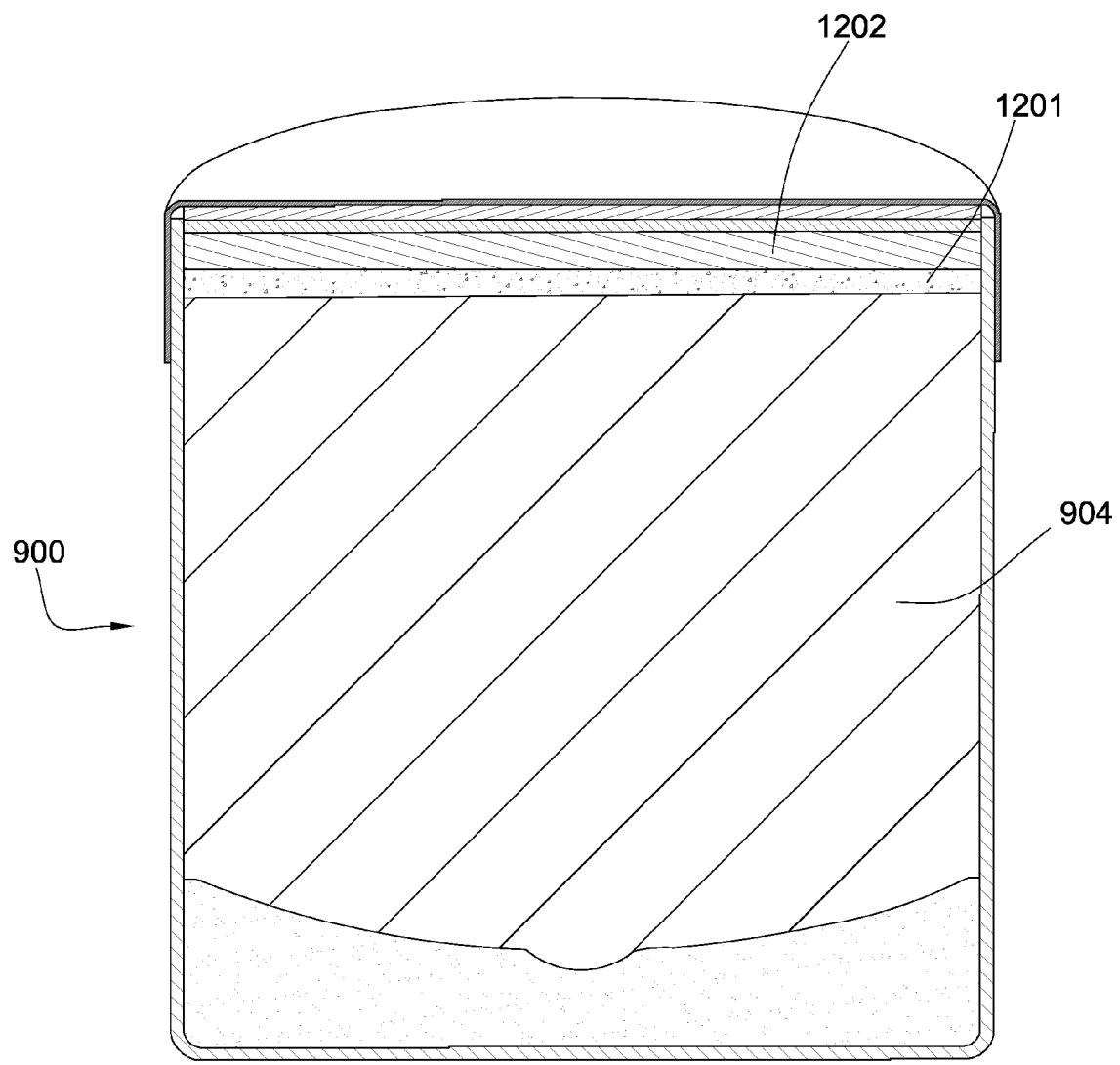
FIG. 12 is a cross-sectional diagram of another embodiment of an assembly for HPHT processing.

FIG. 12 displays a cross-sectional view of another embodiment of an assembly 900 for HPHT processing. In this embodiment a single layer of formable sealant barrier 1201 may be disposed above and adjacent to the substrate 904. A single niobium disc 1202 may be disposed above and adjacent to the formable sealant barrier 1201.

Figure 13:
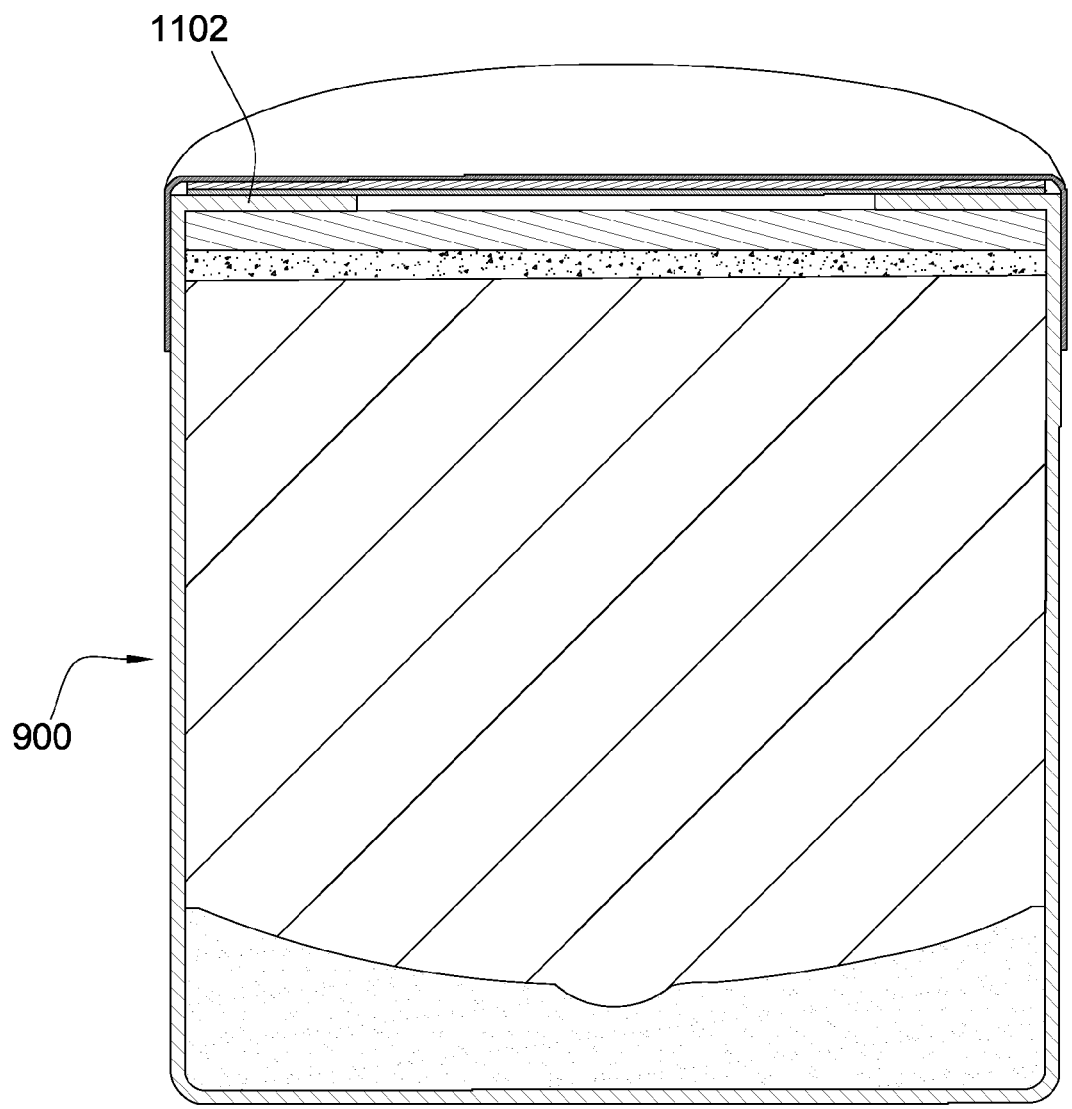
FIG. 13 is a cross-sectional diagram of another embodiment of an assembly for HPHT processing.

FIG. 13 displays a cross-sectional view of another embodiment of an assembly 900 for HPHT processing similar to the embodiment shown in FIG. 11 except with a lid 1102.

Figure 14:
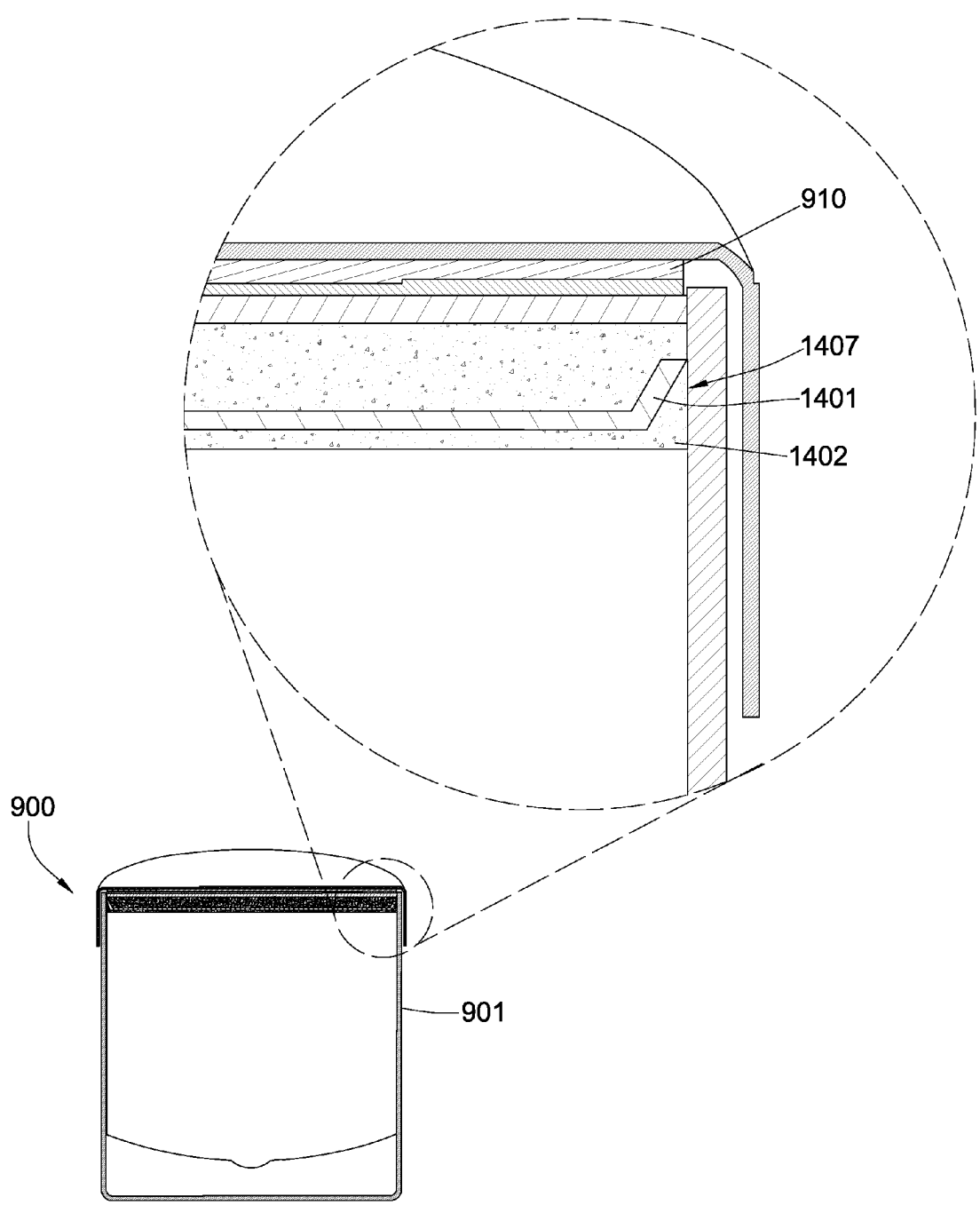
FIG. 14 is a cross-sectional diagram of another embodiment of an assembly for HPHT processing.

FIG. 14 displays a close-up cross-sectional view of another embodiment of an assembly 900 for HPHT processing. In this embodiment the assembly 900 comprises a ram 1401. The ram 1401 may be forcefully inserted into the assembly 900. It is believed that when the ram 1401 is forced into the assembly that it may displace formable sealant barrier 1402 by pushing the formable sealant barrier 1402 to the edges 1407 of the can 901. It is further believed that by displacing the formable sealant barrier 1402 to the edges 1407 of the can 901 that the meltable sealant 910 will be less likely to penetrate past the formable sealant barrier 1402.

Figure 15:
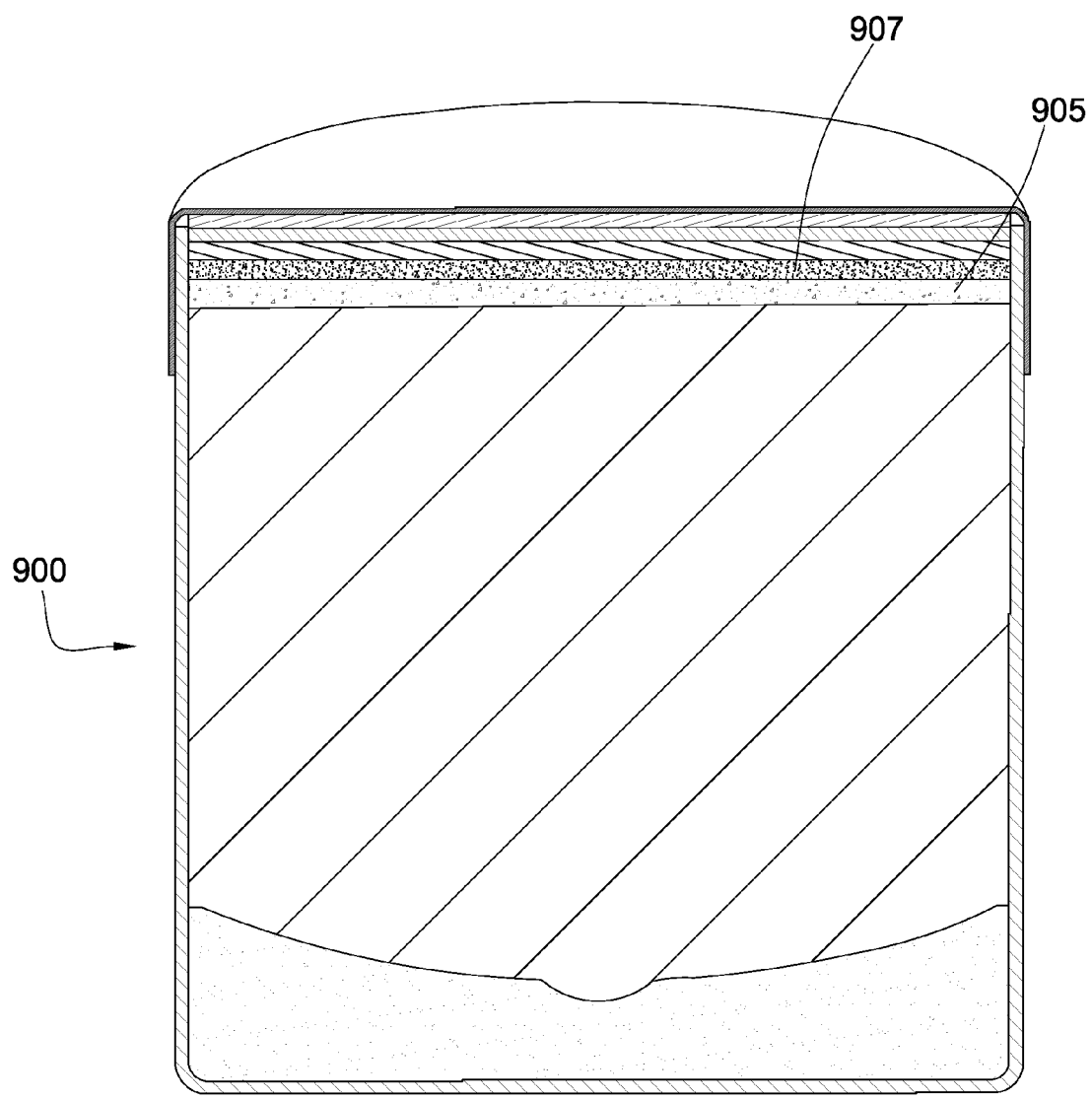
FIG. 15 is a cross-sectional diagram of another embodiment of an assembly for HPHT processing.

FIG. 15 displays a close-up cross-sectional view of another embodiment of an assembly 900 for HPHT processing. In this embodiment the assembly 900 comprises a first layer of formable sealant barrier 905 and a second layer of formable sealant barrier 907. This embodiment differs from previously disclosed embodiments in that the first and second layers of formable sealant barrier 905 and 907 are adjacent to each other.

FIG. 16 displays a flow chart of an embodiment of a method of preparing an assembly for HPHT processing including the steps of providing 1601 an assembly comprising a can with an opening and a mixture disposed within the opening, a substrate being adjacent and above the mixture, a formable sealant barrier positioned above the substrate, a meltable sealant disposed intermediate the sealant barrier and a cap covering the opening; heating 1602 the assembly to a cleansing temperature for a first period of time; and further heating 1603 the assembly to a sealing temperature for a second period of time. This may create a more stable assembly because the internal pressure of the assembly may be the same as the pressure outside of the assembly. This type of assembly may also be less prone to leaks and contamination during HPHT processing and transportation to the processing site.

In one embodiment the assembly may be heated 1602 to the cleansing temperature in a vacuum and then brought back to atmospheric pressure in an inert gas. The assembly may then be further heated 1603 to the sealing temperature while in an inert gas. In other various embodiments, the cleansing temperature may be between 800° C. and 1050° C. and the sealing temperature may be between 1000° C. and 1200° C.

Whereas the present invention has been described in particular relation to the drawings attached hereto, it should be understood that other and further modifications apart from those shown or suggested herein, may be made within the scope and spirit of the present invention.

What is claimed is:

1. An assembly for HPHT processing, comprising:
a can with an opening;
a powder mixture disposed within the opening;
a substrate disposed within the opening adjacent the powder mixture;
a formable sealant barrier disposed within the opening and opposite the powder mixture from the substrate;
a meltable sealant disposed within the opening and opposite the substrate from the formable sealant barrier;
a cap covering the opening;
wherein the formable sealant barrier comprises aluminum oxide, boron nitride or a combination thereof;
a first layer of formable sealant barrier is disposed adjacent to the substrate;
a first niobium disc is disposed intermediate the first layer of formable sealant barrier and a second layer of formable sealant barrier;
an under lap component is disposed adjacent the second layer of formable sealant barrier and opposite the first niobium disc;
a metal disc is disposed opposite the second layer of formable sealant barrier from the under lap component;
the meltable sealant layer is disposed opposite the second layer of formable sealant barrier from the under lap component; and
a cap is placed on the assembly.

2. The assembly of claim 1, wherein the formable sealant barrier comprises a powder.

3. The assembly of claim 1, wherein the assembly comprises an under lap component.

4. The assembly of claim 1, comprising a ram disposed within the opening adjacent the formable sealant barrier.

5. The assembly of claim 1, wherein the formable sealant barrier comprises a first layer and a second layer.

6. The assembly of claim 5, wherein the first layer of formable sealant barrier comprises boron nitride.

7. The assembly of claim 1, wherein the formable sealant barrier comprises a formable anti-wetting material.

8. The assembly of claim 1, wherein the meltable sealant comprises a material selected from the group consisting of copper, nickel, cobalt, gold, silver, manganese, palladium, titanium, niobium, zinc, phosphorus, boron, aluminum, cadmium, chromium, tin, silicon, tantalum, alloys, compound mixtures, and combinations thereof having a melting point, or melting range, at least partially higher than the temperature required to cleanse the assembly.

9. The assembly of claim 1, wherein the can opening comprises a fold.

* * * * *